US006647256B1

(12) United States Patent
Stewen et al.

(10) Patent No.: US 6,647,256 B1
(45) Date of Patent: Nov. 11, 2003

(54) METHODS AND SYSTEM FOR REMOTE ACCESS TO AND PAYMENT FOR PRODUCTS DELIVERED FROM AUTOMATED APPARATUS

(75) Inventors: Teemu Stewen, Helsinki (FI); Seppo Vihinen, Helsinki (FI)

(73) Assignee: Sonera Oyj, Helsinki (FI)

( * ) Notice: Subject to any disclaimer, the term of this patent is extended or adjusted under 35 U.S.C. 154(b) by 0 days.

(21) Appl. No.: 09/559,286

(22) Filed: Apr. 27, 2000

(30) Foreign Application Priority Data

Oct. 29, 1997 (FI) .............................................. 970473 U
Jun. 12, 1998 (FI) ................................................. 981370
Oct. 29, 1998 (WO) ................ PCT/FI98/00843

(51) Int. Cl.⁷ .............................................. H04M 11/10
(52) U.S. Cl. ................. 455/414; 455/414.1; 455/414.2; 455/414.3; 455/414.4; 705/13; 700/231; 370/315
(58) Field of Search .......................... 455/406; 705/13; 200/231; 320/315; 379/114.28

(56) References Cited

U.S. PATENT DOCUMENTS 5,790,936 A * 8/1998 Dinkins ....................... 370/315
5,991,749 A * 11/1999 Morrill, Jr. .................... 705/13
6,198,915 B1 * 3/2001 McGregor et al. ........... 455/406

FOREIGN PATENT DOCUMENTS

| JP | 4-15785 A | 1/1992 |
| JP | 8-227478 A | 9/1996 |
| JP | 8-249530 A | 9/1996 |
| JP | 10-149400 A | 6/1998 |

OTHER PUBLICATIONS

Ny Teknik, vol. 98/36, 1998, J. Mellin, "Betala läsken pa telefonräkningen" p. 11.

* cited by examiner

Primary Examiner—Nguyen T. Vo
Assistant Examiner—David Nguyen
(74) Attorney, Agent, or Firm—Cohen, Pontani, Lieberman & Pavane

(57) ABSTRACT

A system and methods for implementing access to and control of a service in a telecommunication system utilizes a first terminal device, a control center operable for handling short messages and/or data calls, an automated apparatus includes a second terminal device and a control unit connected thereto, a telecommunication network comprising an intelligent network, the intelligent network including means for determining charge and location data and for producing voice messages, a first telecommunication connection, and a second telecommunication connection. The first terminal device, the second terminal device and the control center are connected to the telecommunication network. A product vendable or otherwise accessible or distributable through the automated apparatus is ordered by making a call from the first terminal device to a number shown on or associated with the automated apparatus or with a service to be rendered by an automated apparatus. The control unit controls the automated apparatus and the second terminal device to operatively cause the customer to receive the product or service ordered. If the automated apparatus has run out of the product or has malfunctioned, then the customer is so informed by a voice message delivered to the first terminal through the first telecommunication connection.

18 Claims, 1 Drawing Sheet

METHODS AND SYSTEM FOR REMOTE ACCESS TO AND PAYMENT FOR PRODUCTS DELIVERED FROM AUTOMATED APPARATUS

BACKGROUND OF THE INVENTION

1. Field of the Invention

The present invention relates to methods and apparatus for providing a product or service to user/subscribers of a telecommunication system and, more particularly, to such methods and apparatus in which a calling subscriber's telecommunication system terminal device provides the means of access to products and payment for purchases made through an automated vending or delivery apparatus.

2. Description of Related Art

It is known in the prior art to provide in a telecommunications network various specially-priced service numbers that are common—i.e. accessible—to all callers, as for example telephone numbers beginning with the prefix 0600 or 0700. Such service numbers, so-called B-numbers, are not however actual subscriber numbers; rather, the switching and exchange system of the telecommunication network connects the calling subscriber's calls to the actual subscriber numbers, the so-called C-numbers, behind the service numbers. This type of solution is typically implemented utilizing an intelligent network.

Also known are arrangements in which mobile telecommunication stations are used in various payment systems for electronic payment applications. However, there is no heretofore-available prior art solution with which a customer can use a mobile telecommunication station as a means of payment for different commodities, such for example as beverages, sweets, tobacco and tickets and the like, that are purchased through an automated vending machine. Moreover, the user of a mobile station has not heretofore been able to control or effect the operation of such an automated service or delivery apparatus by means of his/her mobile station.

Currently, the user of the automated apparatus may not necessarily be carrying any cash or coins of suitable value for use in operating the apparatus or making the purchase, in which case it would in accordance with the present invention be practical to pay for vendor purchases using, by way of example, a user's mobile telephone. It has also not been possible in prior art methods and arrangements to predeterminately define a particular limited group of users for which the automated apparatus is intended; rather, the lack of restriction has meant that anyone has been able to use the apparatus or service.

OBJECTS AND SUMMARY OF THE INVENTION

It is accordingly the desideratum of the present invention to eliminate the drawbacks and deficiencies of the prior art, as for example described above.

It is a particular object of the invention to provide a method and system in which a customer's terminal device, preferably a subscriber's mobile phone or station that is connected to a telecommunication network, is operable to function as a means of payment for purchases made through a vending machine or other automated apparatus.

It is a further object of the invention to provide such a method and system in which optional, predetermined actions related to an automated service or product delivery system are carried out by means of a mobile station and a control unit of the automated apparatus and of the mobile station and that is located in the automated apparatus, in accordance with instructions provided by the customer via his/her mobile station.

In accordance with the invention, the system includes a first terminal device, a control center, an automated apparatus comprising a second terminal device and a control unit connected thereto, a telecommunication network comprising an intelligent network, a first telecommunication connection and a second telecommunication connection. The control center preferably incorporates means for handling short messages and/or data calls.

The first and second terminal devices, as well as the control center, are connected to the telecommunication network which may itself include means for determining the location of the calling subscriber. The intelligent network may additionally be provided with means for directing a call to an automated apparatus located nearest to the network-determined location of the terminal device. The intelligent network may also include apparatus or the ability for outputting to the calling subscriber a voice message reporting the status or condition of the automated apparatus and for determining charge data regarding the call.

The control unit incorporates means for controlling and monitoring the functions of the automated apparatus and for monitoring the second telecommunication connection. It further includes means for setting the second terminal device, which may (in preferred forms of the invention) be located in or form an integrated part of the automated apparatus, to a "busy" or "no answer" state and, when necessary, shutting off or powering down the second terminal device. The control unit may for example be implemented by a computer or microcontroller.

In accordance with the methods of the invention, the calling subscriber orders a product from an automated service apparatus (such as a vending machine) by means of a first terminal device by setting up or establishing a first telecommunication connection with the called subscriber number, whereupon the first telecommunication connection is directed to an intelligent network. In the intelligent network, call charge data is determined, a second telecommunication connection with a second terminal device is established and the automated apparatus is controlled, as hereinafter described, by means of a control unit of or associated with the automated apparatus on the basis of the second telecommunication connection and the current state of the automated apparatus.

Thus, if the automated apparatus has run out of the product ordered and/or the service is busy, then the control unit sets the second terminal device to a "busy" or "no answer" state and the user of the first terminal device is informed of this state of the automated apparatus by means of a voice message delivered over the first telecommunication connection.

If, on the other hand, the automated apparatus has run out of all available products and/or services, then the control unit shuts off the second terminal device, and the user of the first terminal device is likewise informed (as by means of a voice message) of this state of the automated apparatus.

In the event of a malfunction in the automated service apparatus, the control unit sets the second terminal device to a "busy" or "no answer" state, and the user of the first terminal device is similarly informed, vocally or otherwise, of this state of the automated apparatus.

In further accordance with the methods and system of the invention, the location of the calling subscriber can be determined on the basis of the location data of the first terminal device and the second telecommunication connection can be set up with a second terminal device (and, thereby, a particular automated apparatus) known or determined to be nearest or closely proximate to the calling subscriber. The user group able or permitted to access an automated apparatus can also be predeterminately limited by remotely identifying the calling subscription and confirming whether that calling subscriber has access rights to the particular products and/or services, as determined by the called subscription rights.

Information about the state or status of the automated apparatus can also be transmitted to a remote service center by periodically or otherwise selectively sending a status inquiry message from the service center to the second terminal device, in response to which the automated apparatus transmits the requested status information to the service center. The automated apparatus may for example inform the service center when the automated apparatus has run out of a product or has malfunctioned. The transmission to the service center of such information regarding the status of the automated apparatus allows for easier and more timely maintenance and refilling of the automated apparatus and makes it unnecessary to separately inspect each apparatus at fixed periods at its physical location. Transmission of the status data may be effected using a data or text message connection.

The inventive system further includes means for directing the first telecommunication connection to an intelligent network and means for setting up a telecommunication connection with the second terminal device.

The methods and system of the invention thus provide a fast, efficient and reliable solution for paying for vended purchases from an automated apparatus by means of a conventional terminal device in or connected or connectable to a telecommunication network. An advantage for the user is the ability to operate the automated apparatus by means of his/her mobile telephone and to activate the automated apparatus to perform predetermined operations relating to the service, e.g. by simply calling an optional predetermined service number. Thus, the mobile station functions as a kind of remote controller of the automated apparatus. Moreover, the user need not carry any cash for such purchases because the charges for the selected automated services are included in the normal telephone bill for the user's mobile subscription.

Other objects and features of the present invention will become apparent from the following detailed description considered in conjunction with the accompanying drawing. It is to be understood, however, that the drawing is designed solely for purposes of illustration and not as a definition of the limits of the invention, for which reference should be made to the appended claims.

BRIEF DESCRIPTION OF THE DRAWING

The single drawing FIGURE schematically depicts a telecommunication system in accordance with and for use in practicing the methods of the present invention.

DETAILED DESCRIPTION OF THE CURRENTLY PREFERRED EMBODIMENTS

Figure 1:
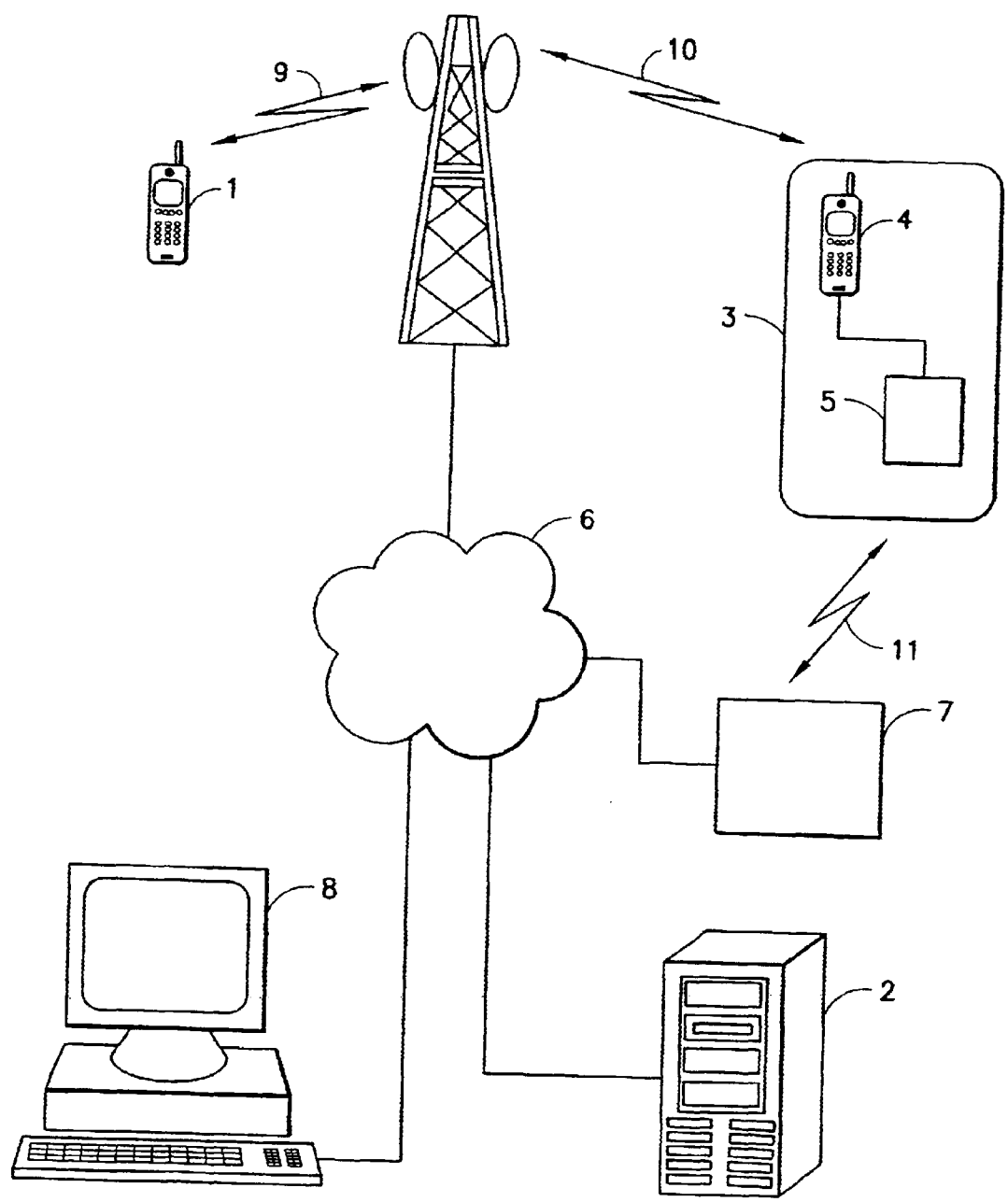

The system shown by way of example in the Figure for use in the practice of the present invention includes a first terminal device 1, a control center 2 that incorporates or implements means for handling short messages and/or data calls, an automated product or service vending apparatus 3 that incorporates a second terminal device 4 and a control unit 5 connected thereto, a telecommunication network 6 that includes or is associated with or in the form of an intelligent network 7 and which incorporates means 8 for determining charge and location data and for producing voice messages, a first telecommunication connection 9 and a second telecommunication connection 10.

In preferred embodiments of the inventive methods and system, the calling subscriber communicates via a first terminal device 1 with a second terminal device 4 over the telecommunication network 6. In the Figure, the first terminal device 1 in telecommunication network 6 is a conventional mobile phone or station, and the second terminal device 4 in the network is also a mobile station. To utilize the payment system of the invention, the calling subscriber dials on his/her mobile station 1 a specially-priced service number, e.g. a number beginning with the digits 0700, from which the call is directed via mobile communication network 6 to intelligent network 7. A number conversion is then carried out by performing known actions, whereupon the call is directed or redirected to the mobile station 4 that is located in or forms a part of the automated apparatus 3; in other words, the call is connected to a so-called C-number. It should be noted that, if desired, the connection with mobile station 4 of automated apparatus 3 can be set established via any of several different numbers; in this manner, differently-priced service numbers can be used to implement billing for differently priced products, all of which may nonetheless be available from the same automated apparatus.

In addition, a billing ticket is generated on the basis of the call, the subscription to be charged being the calling subscription. In a preferred implementation, an intelligent network exchange of the intelligent network 7 takes care of the process of charging for the call and directing the call to the mobile station 4 in automated apparatus 3. This type of operation, based on number conversions in an intelligent network, is known to the person of ordinary skill in the art and is not therefore described herein in detail. In any event, a more detailed discussion of intelligent networks can, by way of illustrative example, be found in ITU-T recommendations Q-121X and in the Bellcore AIN recommendations.

A key aspect of the present invention is the remotely-effected operation of the mobile station 4 located in automated apparatus 3 and, in particular, of the control unit 5 in the automated apparatus. In a preferred implementation, the control unit 5 communicates with both automated apparatus 3 and the associated mobile station 4 and controls the operation of each. The communication between control unit 5 and automated apparatus 3 may, by way of example, be advantageously implemented in any one or more of the following ways:

- emulation of a coin-operated lock, so that the control unit simulates a coin-operated lock by providing to the automated apparatus signals corresponding to those normally provided by a conventional coin-operated lock, as for example via a relay switch or the like;
- card reader emulation dialogue with the central processing unit of the automated apparatus; and/or
- user emulation, i.e. the pressing of option buttons provided in the automatic apparatus and reading of the switches to obtain relevant information, such as when the automated apparatus has run out of product.

The communication between the control unit 5 and mobile station 4 in automated apparatus 3 is preferably implemented using a series protocol. In a preferred embodiment of the invention, the mobile telephone in the automated apparatus is a Siemens M1, which uses the expanded AT command language. However, many other alternatives regarding the second terminal device and the command language may be utilized. In any event, in preferred implementations the communication will or may include, by way of example, the following actions:

answering of the call or leaving it unanswered, which can be done either using a voice prompt, in which case the telephone is connected to an answering machine or the like, or by using a signal tone, in which case the modem answer-back tone obtained in data and telefax connections can be employed;

information concerning the connection state of the call, as for example to ensure correct billing;

disconnection of the call upon the lapse of a certain period of time;

optional calling subscriber identification;

pretending to be busy; and/or quitting the network.

Thus, the control unit 5 monitors and controls mobile station 4 and the automated apparatus 3. If desired, control unit 5 may only answer an incoming call if automated apparatus 3 is able to carry out the selected action(s). Mobile station 4 may also pretend to be busy, quit the network altogether (i.e. switching off power to the mobile station), and/or report an error condition. After carrying out the instructed function, control unit 5 releases the call to free the line. The control unit 5 in automated apparatus 3 may for example comprise a computer, microcontroller or similar electronics unit, which interfaces mobile station 4 with automated apparatus 3 and operatively activates the automated apparatus to perform the predetermined actions forming or constituting the service. Control unit 5 preferably transmits control data to automated apparatus 3 on the basis of the number dialed by the calling subscriber and carries out the aforementioned or otherwise appropriate operations.

The automated apparatus 3 may, for example, comprise a jukebox or an apparatus for vending or selling drinks and/or tickets and/or any other article or service, such as a device controlling a barrier or gate at the entrance to a parking area. Thus, apparatus 3 may be any automated apparatus providing or vending commodities, such as articles, and/or services. By way of illustration, in the case-of a jukebox when a customer makes a call from his/her terminal device 1 to the number identified with the automated service, the control unit 5 activates the jukebox to cause it to play the music selected by the customer. Thus, the customer need not insert any money into the automated apparatus 3 but, instead, the bill for the automated service is included in the telephone bill for the user's calling subscription.

It is also within the intended scope and contemplation of the invention to include IVR (Interactive Voice Response) functionality in the payment system of the invention, in which case the IVR system may inquire of the user as to which particular product or service is to be accessed or purchased. The user may for example provide the answer in the form of DTMF (Dual Tone MultiFrquency) tone signals via the keypad of his/her mobile station 1, whereupon the call is directed to the terminal device 4 in automated apparatus 3 and the appropriate billing or metering pulses or data are transmitted to the intelligent network system 7. IVR can be used to provide the necessary prompts if this functionality is not present in automated apparatus 3.

In an embodiment of the payment system of the invention, a connection with automated apparatus 3 may for example be set up by calling the mobile station 4 in apparatus 3 via any of several different service numbers to order different and/or differently-priced products or services. The payment system may for example utilize the voice, data and fax numbers of a GSM (Global System for Mobile Communications) telephone, thus permitting several substantially simultaneous or concurrent calls to be logically connected to the telephone 4 in apparatus 3 at the same time. In the control unit, the incoming data numbers and fax numbers are interpreted on the basis of their type (e.g. fax, data 9600, data 4800, and so on) as differently priced calls. The actual tasks of determining the price and directing the calls to the appropriate numbers are performed in intelligent network 7. Alternatively, the calling subscriber number identification feature of a GSM telephone may be utilized so that different originating (i.e. calling subscriber) numbers are directed in the intelligent network system 7 or IVR via physically or logically different lines to the automated apparatus, thus enabling the automated apparatus to determine the call price to be charged on the basis of the calling subscriber number.

In other or alternate or modified embodiments of the invention, the mobile station 4 may optionally be replaced with a specialized communication device forming an integrated part of the automated apparatus 3 and designed expressly for wireless data transmission, such as a wireless modem. If desired, access to the service can also be permitted or accommodated from wired-network telephones and other terminal devices. In any event, as should now be apparent the basic concept of the present invention is that the customer's communication terminal or device, such as the preferred mobile station 1, is operable to function as a personal payment terminal for use in controlling an adjacent or nearby or otherwise located automated apparatus 3 in the manner of a remote control device for the apparatus 3.

Moreover, the payment methods and system of the invention render it possible to make effective use of many additional features of the telecommunication network 6, such as area control and/or location data, to provide that a given originating telephone number works only in a predetermined part of the country or other geographic region located in the general or immediate vicinity of the automated apparatus 3, thus eliminating unnecessary calls to a wrong number. Such area control also permits use of the same destination number in multiple distinct geographic areas for reaching and controlling respectively different and distinct automated apparatus.

Similarly, specific user groups having multiple different access rights or abilities can be selectively defined. This arrangement can provide particularly useful functionality in a number of implementations, as for example in an application for operating or opening a garage door or parking garage entry barrier. In this case, the automated apparatus 3 determines access rights by checking the calling number against, for example, a service-specific listing of allowed callers or users.

Thus, while there have shown and described and pointed out fundamental novel features of the invention as applied to preferred embodiments thereof, it will be understood that various omissions and substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for providing a service, provided by an automated service apparatus, under remote user control using a first terminal device of the user that is connectable to a telecommunication network comprising an intelligent network including a control center having means for handling one of short messages and data calls, a second terminal device connectable to the telecommunication network and located in the automated service apparatus, a control unit located in the automated service apparatus and connected to the second terminal device and the automated service apparatus, means in the intelligent network for determining charge and location data and for producing voice messages, a first telecommunication connection establishable between the first terminal device and the telecommunication network, and a second telecommunication connection establishable between the telecommunication network and the second terminal device, said method comprising the steps of:

establishing the first telecommunication connection by user operation of the first terminal device to initiate a call from the first terminal device to a predetermined called subscriber number associated with the service to be provided by the automated service apparatus, the call initiated from the first terminal device being directed through the first telecommunication connection to the intelligent network of the telecommunication network;

determining, in the intelligent network, charge data associated with the call;

establishing, through the intelligent network in response to the establishing of the first telecommunication connection, the second telecommunication connection from the telecommunication network to the second terminal device; and controlling the automated service apparatus, by operation of the control unit in response to establishing of the second telecommunication connection and subject to a state of the automated service apparatus, to carry out the service to be provided by the automated service apparatus in response to user establishment of the first telecommunication connection from the first terminal device by user initiation of the call to the predetermined called subscriber number.

2. A method in accordance with claim 1, wherein the service provided by the automated service apparatus comprises distribution of a product stored by the automated service apparatus, and wherein if one of the automated service apparatus runs out of the stored product and the automated service apparatus is currently busy servicing an earlier-received other-user request for the service, the method then further comprises the steps of:

operating the control unit to set the second terminal device to one of a busy state and a no-answer state to reflect current unavailability of the service; and informing the user of the first terminal device of the current unavailability of the service by means of a voice message transmitted to the user over the first telecommunication connection.

3. A method in accordance with claim 1, wherein the service provided by the automated service apparatus comprises distribution of any of a plurality of products stored by the automated service apparatus, and wherein if the automated service apparatus runs out of all of the plural stored products, the method then further comprises the steps of:

operating the control device to shut off the second terminal device to reflect current unavailability of the service; and informing the user of the first terminal device of the current unavailability of the service by means of a voice message transmitted to the user over the first telecommunication connection.

4. A method in accordance with claim 1, wherein in the event of a malfunction of the automated service apparatus, the method then further comprises the steps of:

operating the control unit to set the second terminal device to one of a busy state and a no-answer state to reflect current unavailability of the service; and informing the user of the first terminal device of the current unavailability of the service by means of a voice message transmitted to the user over the first telecommunication connection.

5. A method in accordance with claim 1, wherein the automated service apparatus comprises a plurality of automated service apparatus at respectively geographically spaced apart locations, further comprising the steps of:

determining, in the intelligent network, a current location of the first terminal device from which the call to the predetermined called subscriber number has been initiated using location data of the first terminal device; and establishing the second telecommunication connection from the telecommunication network to a one of the plural automated service apparatus that is located nearest to the determined current location of the first terminal device.

6. A method in accordance with claim 1, further comprising the steps of:

identifying in the intelligent network a calling subscription associated with one of the user and the first terminal device from which the call has been initiated to establish the first telecommunication connection; and verifying access rights, to the service, in the user based on subscriber access rights associated with the identified calling subscription.

7. A method in accordance with claim 1, further comprising the step of transmitting, from the control unit to the control center, a current state of the automated service apparatus in response to one of:

transmission of a status inquiry message from the control center to the second terminal device;

exhaustion of supply of the product stored in the automated service apparatus; and a malfunction of the automated service apparatus.

8. A method in accordance with claim 1, further comprising the step of transmitting, from the control unit to the control center, a current state of the automated service apparatus over one of a data connection and a text message connection.

9. A system for providing a service, provided by an automated service apparatus, to a user under remote user control using a first terminal device of the user that is connectable to a telecommunication network, the telecommunication network comprising an intelligent network that includes means for determining charge and location data and for producing voice messages and a control center having means for handling one of short messages and data calls, the system comprising:

- a second terminal device connectable to the telecommunication network and located in the automated service apparatus;
- a control unit located in the automated service apparatus and connected to the second terminal device and to the automated service apparatus;
- the telecommunication network having a predetermined called subscriber number associated with the service to be provided by the automated service apparatus such that, when user operation of the first terminal device initiates a call from the first terminal device to the predetermined called subscriber number, the telecommunication network establishes a first telecommunication connection between the first terminal device and the telecommunication network, the intelligent network determines charge data associated with the call to the predetermined called subscriber number, and the telecommunication network establishes a second telecommunication connection between the telecommunication network and the second terminal device; and
- wherein said control unit is operable for monitoring functions of the automated control apparatus, for monitoring the second telecommunication connection, and for controlling operation of the automated service apparatus in response to the establishment and monitoring of the second telecommunication connection to provide the service in response to user initiation of the call to the predetermined called subscriber number associated with the service to be provided by the automated service apparatus.

10. A system in accordance with claim 9, wherein said control unit is further operable for setting the second terminal device to one of a busy state and a no-answer state.

11. A system in accordance with claim 9, wherein said control unit is further operable for shutting off the second terminal device.

12. A system in accordance with claim 9, further comprising means in the telecommunication network for delivering, from the means for producing voice messages to the first terminal device through the first telecommunication connection, a voice message informing the user of a current status of the automated service apparatus.

13. A system in accordance with claim 9, further comprising means in the telecommunication network for determining calling subscriber current location data for the first terminal device from which the call to the predetermined subscriber number has been initiated.

14. A system in accordance with claim 13, wherein the automated service apparatus comprises a plurality of automated service apparatus at respectively geographically spaced apart locations, each of the automated service apparatus having a respective second terminal device and a respective control unit located in the each automated service apparatus, and wherein the second telecommunication connection is established between the telecommunication network and a one of the plural automated service apparatus that is located nearest to the telecommunication network-determined current location of the first terminal device from which the call to the predetermined subscriber number has been initiated.

15. A system in accordance with claim 9, wherein the second terminal device includes means for transmitting and receiving one of short messages and data calls.

16. A system in accordance with claim 9, wherein said control unit comprises one of a computer and a microcontroller.

17. A system in accordance with claim 9, wherein said first terminal device comprises a mobile station.

18. A system in accordance with claim 9, wherein said first terminal device comprises a tone frequency telephone apparatus.

* * * * *